(12) United States Patent
Chelian

(10) Patent No.: US 10,391,844 B2
(45) Date of Patent: Aug. 27, 2019

(54) VEHICLE DISPLAY SCREEN SAFETY AND PRIVACY SYSTEM

(71) Applicant: Toyota Motor Engineering & Manufacturing North America, Inc., Plano, TX (US)

(72) Inventor: Suhas E. Chelian, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 2 days.

(21) Appl. No.: 15/967,282

(22) Filed: Apr. 30, 2018

(65) Prior Publication Data

US 2019/0126730 A1 May 2, 2019

Related U.S. Application Data

(63) Continuation of application No. 15/208,530, filed on Jul. 12, 2016, now Pat. No. 9,956,854.

(51) Int. Cl.
*B60J 3/04* (2006.01)
*B60R 1/08* (2006.01)
*B60R 1/04* (2006.01)
*G02F 1/137* (2006.01)
*G02F 1/13* (2006.01)

(52) U.S. Cl.
CPC ........ *B60J 3/04* (2013.01); *B60R 1/04* (2013.01); *B60R 1/08* (2013.01); *G02F 1/137* (2013.01); *G02F 1/1313* (2013.01); *G02F 2001/13756* (2013.01)

(58) Field of Classification Search
CPC ........ B60J 3/04; B60R 1/04; B60R 1/08; G02F 1/137; G02F 1/1313; G02F 2001/13756
See application file for complete search history.

(56) References Cited

U.S. PATENT DOCUMENTS

2010/0265583 A1* 10/2010 Martin ............... G02B 27/0101
359/490.01

* cited by examiner

*Primary Examiner* — Nathanael R Briggs
(74) *Attorney, Agent, or Firm* — Snell & Wilmer LLP

(57) ABSTRACT

A system for improving safety while providing privacy for a vehicle. The system includes a display screen located within the vehicle, configured to alternate between a displaying state and a non-displaying state. The system includes a window configured to alternate between an opaque state and a transparent state. The system includes an electronic control unit (ECU) configured to determine whether the display screen is powered on. The ECU is configured to alternate the display screen between the displaying state and the non-displaying state at a predetermined frequency when the display screen is powered on. The ECU is configured to alternate the window between the opaque state and the transparent state at the predetermined frequency, the display screen being in the displaying state when the window is in the opaque state and the display screen being in the non-displaying state when the window is in the transparent state.

20 Claims, 14 Drawing Sheets

VEHICLE DISPLAY SCREEN SAFETY AND PRIVACY SYSTEM

CROSS REFERENCE TO RELATED APPLICATIONS

This application is a continuation of U.S. patent application Ser. No. 15/208,530, filed on Jul. 12, 2016, now U.S. Pat. No. 9,956,854, the entire contents of this application are hereby incorporated by reference herein.

BACKGROUND

1. Field

The present disclosure relates to a system for improving safety while providing privacy, and more particularly to a system for improving safety while providing privacy for display screens within a vehicle.

2. Description of the Related Art

Vehicles, such as automobiles, may contain one or more devices having display screens within a passenger cabin of the vehicle. For example, a vehicle may include a navigation and/or media system integrated into a dashboard of the vehicle. A vehicle may also include an entertainment unit capable of playing a DVD, a video game, or television. The display screens of these entertainment units may be located on the headrest of a seat, facing a rear passenger of the vehicle.

However, the display screens of the devices within the vehicle may be a distraction to other drivers who are driving behind the vehicle. In addition, an occupant of the vehicle may wish to have the display screen blocked from the view of others outside the vehicle. Thus, there is a need for systems and methods for providing safety and privacy with respect to display screens within a vehicle.

SUMMARY

What is described is a system for improving safety while providing privacy for a vehicle. The system includes a display screen located within the vehicle, and configured to alternate between a displaying state and a non-displaying state. The system also includes a window of the vehicle configured to alternate between an opaque state and a transparent state. The system also includes an electronic control unit (ECU) connected to the window and the display screen. The ECU is configured to determine whether the display screen is powered on. The ECU is also configured to alternate the display screen between the displaying state and the non-displaying state at a predetermined frequency when the display screen is powered on. The ECU is also configured to alternate the window between the opaque state and the transparent state at the predetermined frequency, the display screen being in the displaying state when the window is in the opaque state and the display screen being in the non-displaying state when the window is in the transparent state.

Also described is a vehicle including a display screen located at a display screen location within the vehicle. The vehicle also includes a window having a plurality of regions, each region configured to transition between an opaque state and a transparent state. The vehicle also includes an outside viewer sensor configured to detect spatial data associated with an outside viewer located outside of the vehicle. The vehicle also includes an electronic control unit (ECU). The ECU is configured to determine whether the display screen is powered on. The ECU is also configured to determine an outside viewer location based on the spatial data when the display screen is powered on. The ECU is also configured to determine a viewing region of the window through which the outside viewer views the display screen based on the display screen location and the outside viewer location. The ECU is also configured to set the viewing region of the window to the opaque state.

Also described is a method for providing privacy for a vehicle having a rear window and a display screen located at a display screen location. The method includes detecting, by an outside viewer sensor, spatial data associated with an outside viewer located outside of the vehicle. The method also includes determining, by an electronic control unit (ECU), whether the display screen is powered on. The method also includes determining an outside viewer location based on the spatial data when the display screen is powered on. The method also includes determining, by the ECU, a viewing region of the window through which the outside viewer views the display screen based on the display screen location and the outside viewer location. The method also includes setting, by the ECU, the viewing region of the window to the opaque state.

BRIEF DESCRIPTION OF THE DRAWINGS

Other systems, methods, features, and advantages of the invention will be or will become apparent to one of ordinary skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

Disclosed herein are systems and methods for providing privacy for a display screen within a vehicle. The systems and methods provide several benefits and advantages such as reducing distractions for other drivers by obscuring a view of a display screen within the vehicle. In addition, occupants within the vehicle with the display screen have an increased sense of privacy. The systems and methods obscure the display screen and/or the vehicle window in order to prevent or block an outside viewer's view to the display screen within the vehicle.

An exemplary system includes a display screen located within the vehicle, and configured to alternate between a displaying state and a non-displaying state. The system also includes a window of the vehicle configured to alternate between an opaque state and a transparent state. The system also includes an electronic control unit (ECU) connected to the window and the display screen. The ECU is configured to determine whether the display screen is powered on. The ECU is also configured to alternate the display screen between the displaying state and the non-displaying state at a predetermined frequency when the display screen is powered on. The ECU is also configured to alternate the window between the opaque state and the transparent state at the predetermined frequency, the display screen being in the displaying state when the window is in the opaque state and the display screen being in the non-displaying state when the window is in the transparent state. The predetermined frequency exceeds a value such that the alternating of the display screen between the displaying state and the non-displaying state and the alternating of the window between the opaque state and the transparent state are undetectable using human vision.

As used herein, and as can be understood by one skilled in the art, the term "opaque" may refer to tinting, coloring, or obscuring of various degrees of light transmittance (e.g., 100% opaque, 90% opaque, 50% opaque, etc.). For example, a window set to an opaque state may be fully opaque such that no light passes through the window, or may be partially opaque, such that 50% of light passes through the window.

Figure 1A:
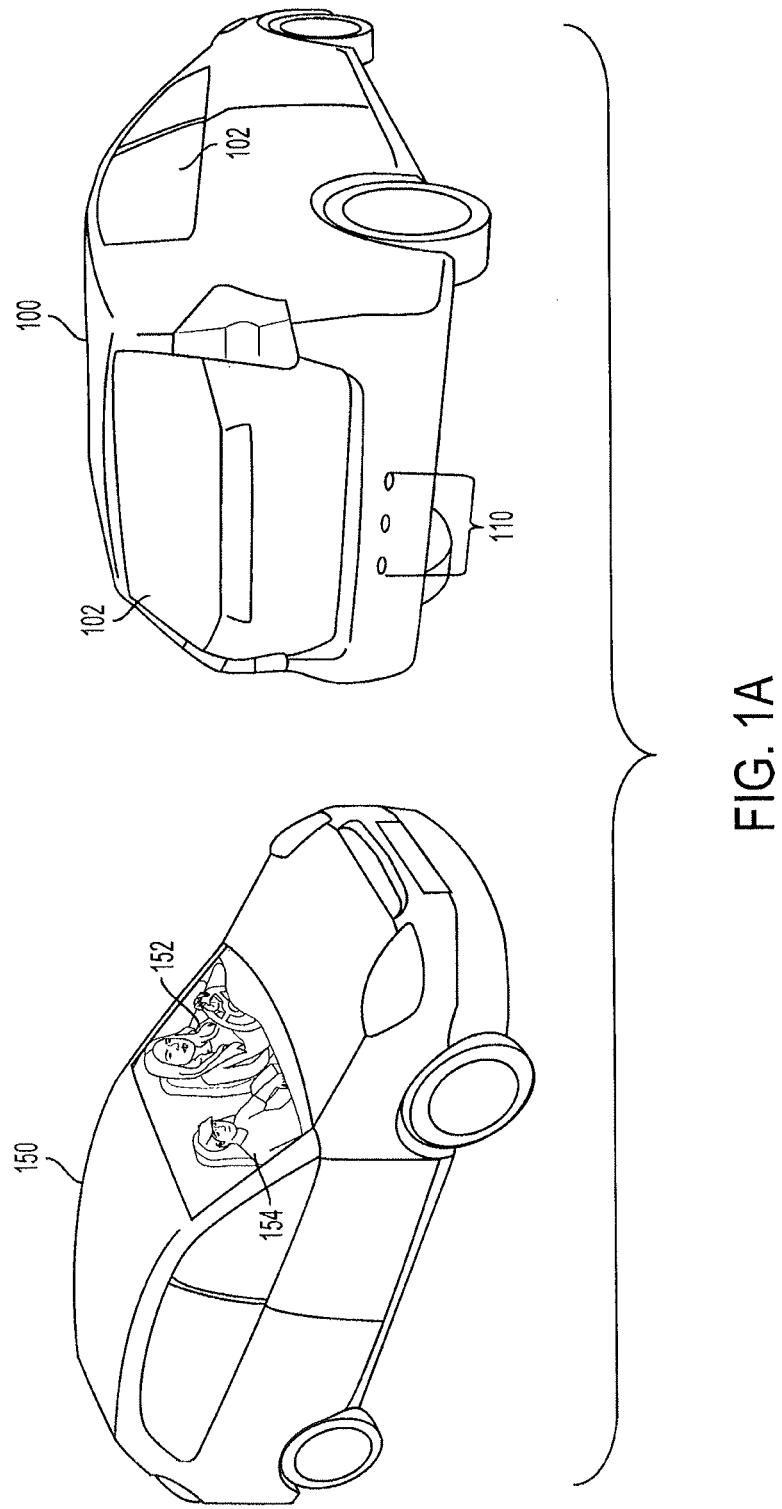
FIG. 1A illustrates a perspective view of an exemplary situation for the vehicle display screen safety and privacy system, according to an embodiment of the invention.

FIG. 1A illustrates a perspective view of an exemplary situation for the vehicle display screen safety and privacy system, according to an embodiment of the invention. In many situations, a vehicle 100 having a window 102 drives ahead of a secondary vehicle 150. In many embodiments, the window 102 is a rear window of the vehicle 100. In some embodiments, the window 102 is a side window of the vehicle 100. The vehicle 100 may have one or more outside viewer sensors 110 for determining a relative location of the secondary vehicle 150 to the vehicle 100. In some embodiments, the outside viewer sensors 110 (and associated detection and/or processing devices) are configured to determine a location of a driver 152 and/or a passenger 154 of the secondary vehicle 150. In particular, the outside viewer sensors 110 may be used to determine an eye location or an eye level of the driver 152 and/or the passenger 154.

Figure 1B:
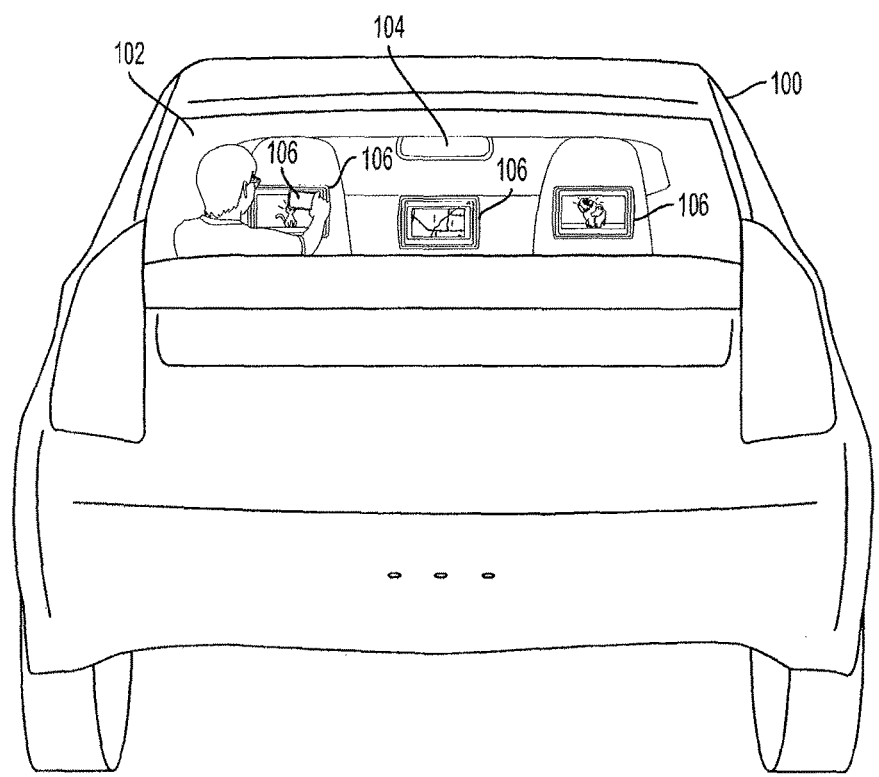
FIG. 1B illustrates an outside viewer point of view of an exemplary situation for the vehicle display screen safety and privacy system, according to an embodiment of the invention.

In some situations, the driver 152 or the passenger 154 of the secondary vehicle 150 may be able to look into the vehicle 100 through the window 102. FIG. 1B illustrates an example embodiment of one such situation, from the perspective of the driver 152 or the passenger 154 of the secondary vehicle 150, generally referred to herein as an outside viewer. In some embodiments, the outside viewer is a pedestrian, on foot. The outside viewer is able to see through the rear window 102 of the vehicle 100 to view one or more display screens 106 located inside the vehicle 100. In some embodiments, the display screens 106 are for different devices, such as a navigation system, a personal mobile device (e.g., smartphone, tablet, or laptop) or an entertainment unit (e.g., a DVD player, a satellite television receiver, an internet connected media device capable of streaming content from a remote server over the internet, or a video game console).

In some situations, the outside viewer being able to see into the vehicle 100 and the display screens 106 therein may be a distraction to the outside viewer. When the outside viewer is a driver of another vehicle (as illustrated in FIG. 1), the distraction may pose a safety hazard. In addition, an occupant of the vehicle 100 may have a privacy concern regarding the outside viewer's ability to see into the vehicle 100 and the display screens 106 therein. The system provides privacy for the vehicle 100 by obscuring the window 102 between the outside viewer and the display screens 106.

In some embodiments, the window 102 and the display screens 106 are coordinated in such a way that the window 102 rapidly alternates between an opaque state and a transparent state and the display screens 106 rapidly alternate between a displaying state and a non-displaying state, at the same frequency. In addition, the window 102 alternates states at a sufficient frequency such that a person viewing the window 102 does not notice that the window 102 is alternating between the opaque and transparent states. Accordingly, the display screens 106 alternate between the displaying and non-displaying states at the same frequency, such that a person viewing the display screens 106 does not notice that the display screens 106 are alternating between the displaying and non-displaying states. In order to obscure the display screens 106 to the outside viewer, the window 102 is in the opaque state when the display screens 106 are in the displaying state and the window 102 is in the transparent state when the display screens 106 are in the non-displaying state.

In other embodiments, the entire window 102 is in an opaque state when a display screen 106 is in a displaying state. In other embodiments, the system determines an eye location or an eye level (or an eye viewing angle) of the outside viewer and portions of the window 102 corresponding with the display screens 106 from the point of view of the outside viewer are obscured by being in an opaque state, and a remainder of the window 102 is in a transparent state.

In yet other embodiments, the window 102 is polarized in a first direction and the display screens 106 are polarized in a second direction, such that light from the display screen 106 is filtered out by the window 102.

Figure 2A:
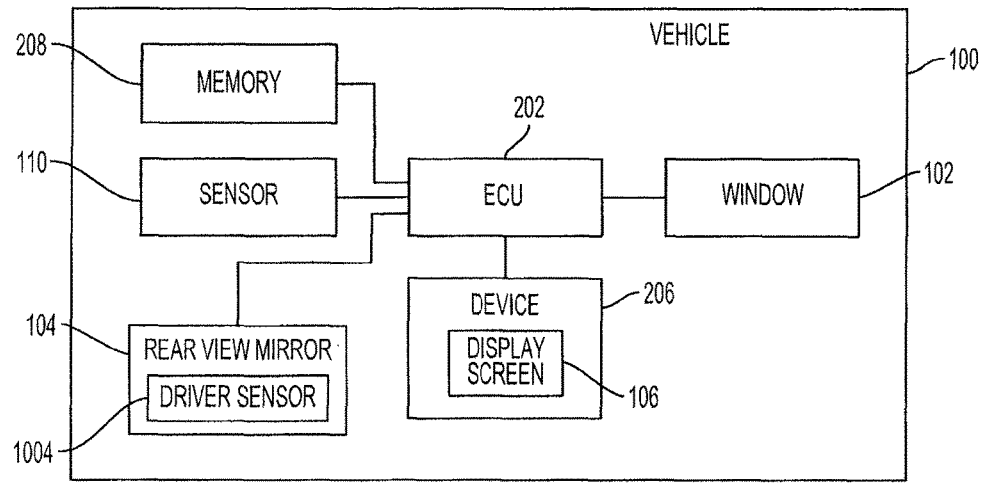
FIGS. 2A and 2B depict block diagrams of components of the vehicle display screen safety and privacy system, according to embodiments of the invention.

FIG. 2A is a block diagram of the vehicle 100 with an integrated device 206, in accordance with an embodiment of the invention. The vehicle 100 includes an electronic control unit (ECU) 202, the window 102, a device 206 with the display screen 106, the sensor 110, a memory 208, and the rear view mirror 104 with a driver eye sensor 1004 (and associated detection and/or processing devices).

The device 206 may be any integrated device within the vehicle 100, such as a navigation system, an entertainment unit or an infotainment system. The device 206 is connected to the ECU 202 via a wired connection. For example, when the device 206 is an integrated navigation system, an integrated entertainment unit or an integrated infotainment system, a wired connection may be established between the ECU 202 and the device 206 using a cable, such as a Universal Serial Bus (USB) cable, an Ethernet cable, or the like.

The sensor 110 is configured to determine a location of another vehicle (e.g., the secondary vehicle 150 of FIG. 1A) in the vicinity of the vehicle 100. In some embodiments, the outside viewer sensor 110 is a camera configured to detect image data. In some embodiments, the outside viewer sensor 110 is a radar sensor configured to detect spatial data. In some embodiments, the outside viewer sensor 110 is a Light Detection and Ranging (LIDAR) sensor also configured to detect spatial data. In some embodiments, the ECU 202 determines spatial data based on detected image data using image processing.

The memory 208 is configured to store vehicle recognition data identifying types of vehicles based on the image data or spatial data detected by the outside viewer sensor 110. The memory 208 is also configured to store device data associated with the device 206, including the location of the display screen 106 within the vehicle 100.

The window 102 is capable of being in a transparent state or an opaque state and transitioning between the two states. In some embodiments, the entire window 102 is in the transparent state or the opaque state. The window 102 may be made of multiple regions, each region capable of being in the transparent state or the opaque state. In some embodiments, the window 102 is an electrically switchable glass, which is capable of being transparent or opaque based on a voltage applied to the glass. The voltage causes particles within the glass to behave in a particular manner, achieving the transparent or opaque states.

The ECU 202 is connected to the outside viewer sensor 110, the window 102, the memory 208, the device 206 and the display screen 106. The ECU 202 is configured to coordinate between the window 102, the display screen 106, and the outside viewer sensor 110 to obscure a view of the display screen 106 to the outside viewer, as described herein. In some embodiments, the ECU 202 is a controller, such as a privacy controller or a window opacity controller configured to control or instruct the window 102, the display screen 106, and the outside viewer sensor 110.

The rear view mirror 104 is connected to the ECU 202 and includes a driver eye sensor 1004 configured to determine a direction a driver of the vehicle 100 is looking at. The window 102 may adjust opacity based on the direction the driver is looking. When window 102 is set to an opaque state in order to obscure the view of the display screen 106, the driver's view may consequently also be obstructed. Therefore, in order to provide an unobstructed view for the driver, the driver eye sensor 1004 detects when the driver is looking into the window 102 so that the window 102 may be set to a transparent state.

Figure 2B:
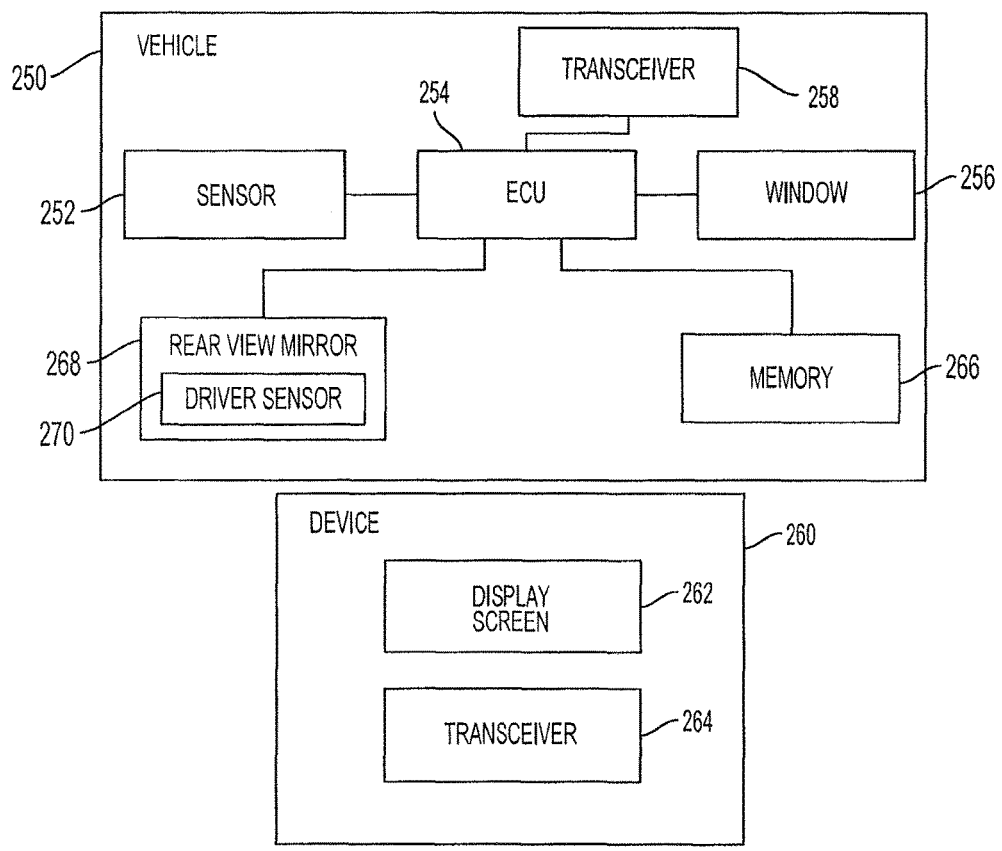

FIG. 2B is a block diagram of the vehicle 250 with a separate device 260, in accordance with embodiments of the invention. The vehicle 250 includes an ECU 254, a window 256, an outside viewer sensor 252, a memory 266, a transceiver 258, and a rear view mirror 268 with a driver eye sensor 270. The ECU 254, the window 256, the outside viewer sensor 252, the memory 266, and the rear view mirror 268 with the driver eye sensor 270 are similar to the ECU 202, the window 102, the outside viewer sensor 110, the memory 208, and the rear view mirror 104 with the driver eye sensor 1004 of FIG. 2A and are configured to perform similarly. The vehicle transceiver 258 is configured to transmit and receive data to and from other devices, including the device 260. In some embodiments, the ECU 254 communicates with the device 260 via the vehicle transceiver 258 using a wireless communications protocol such as Bluetooth or Wi-Fi Direct. In some embodiments, the ECU 254 communicates with the device 260 via a wired communications protocol, such as a CAN bus. In some embodiments, the vehicle 250 communicates with other vehicles via the vehicle transceiver 258 using a vehicle-to-vehicle communications protocol, such as DSRC.

The device 260 includes a display screen 262 and a device transceiver 264. The device transceiver 264 is configured to transmit and receive data to and from other devices. In some embodiments, the device 260 communicates with the ECU 254 of the vehicle 250 via the device transceiver 264 using a wireless communications protocol. In some embodiments, the device 260 communicates with the ECU 254 via a wired communications protocol, such as a CAN bus.

The device 260 is physically within the boundaries of the vehicle 250 but may not be a permanent part of the vehicle 250. In some embodiments, the device 260 is a third-party navigation system attached to a windshield or a dashboard. In some embodiments, the device 260 is a mobile device attached to the vehicle 250 or in the possession of an occupant of the vehicle 250. The device 260 has a display screen 262 similar to the display screen 106 of FIG. 2A.

Figure 3:
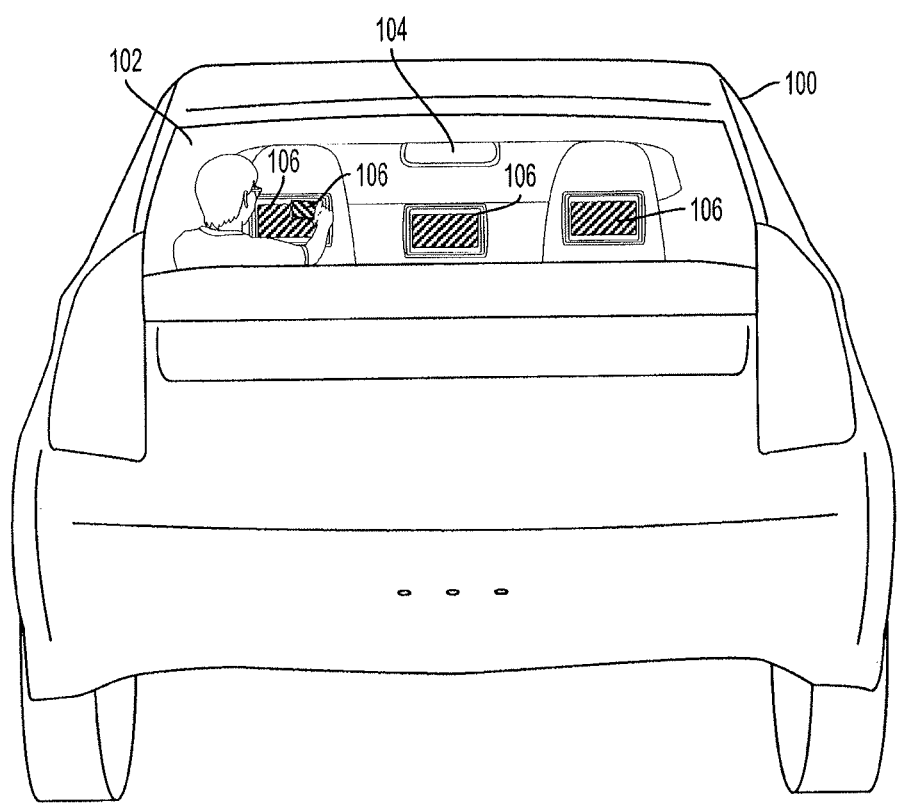
FIG. 3 illustrates an outside viewer point of view in the vehicle display screen safety and privacy system, according to an embodiment of the invention.

FIG. 3 illustrates the vehicle 100 from a point of view of an outside viewer, in accordance with an embodiment of the invention. As compared to FIG. 1B, the display screens 106 appear darkened and are unable to be viewed by the outside viewer. The rest of the window 102 is capable of being seen through. The outside viewer is able to see through the vehicle 100 onto oncoming traffic issues, such as a stalled vehicle, oncoming traffic, or traffic congestion.

In an exemplary embodiment, the ECU 202, connected to the window 102 and the device 206 having the display screen 106, rapidly alternates the window 102 between an opaque state and a transparent state, and simultaneously, the ECU 202 rapidly alternates the display screen 106 of the device 206 between a displaying state and a non-displaying state. The window 102 is in the opaque state when the display screen 106 is in the displaying state and the window 102 is in the transparent state when the display screen 106 is in the non-displaying state. As a result, the display screen 106 is obscured from the view of the outside viewer, as illustrated in FIG. 3.

Figure 4:
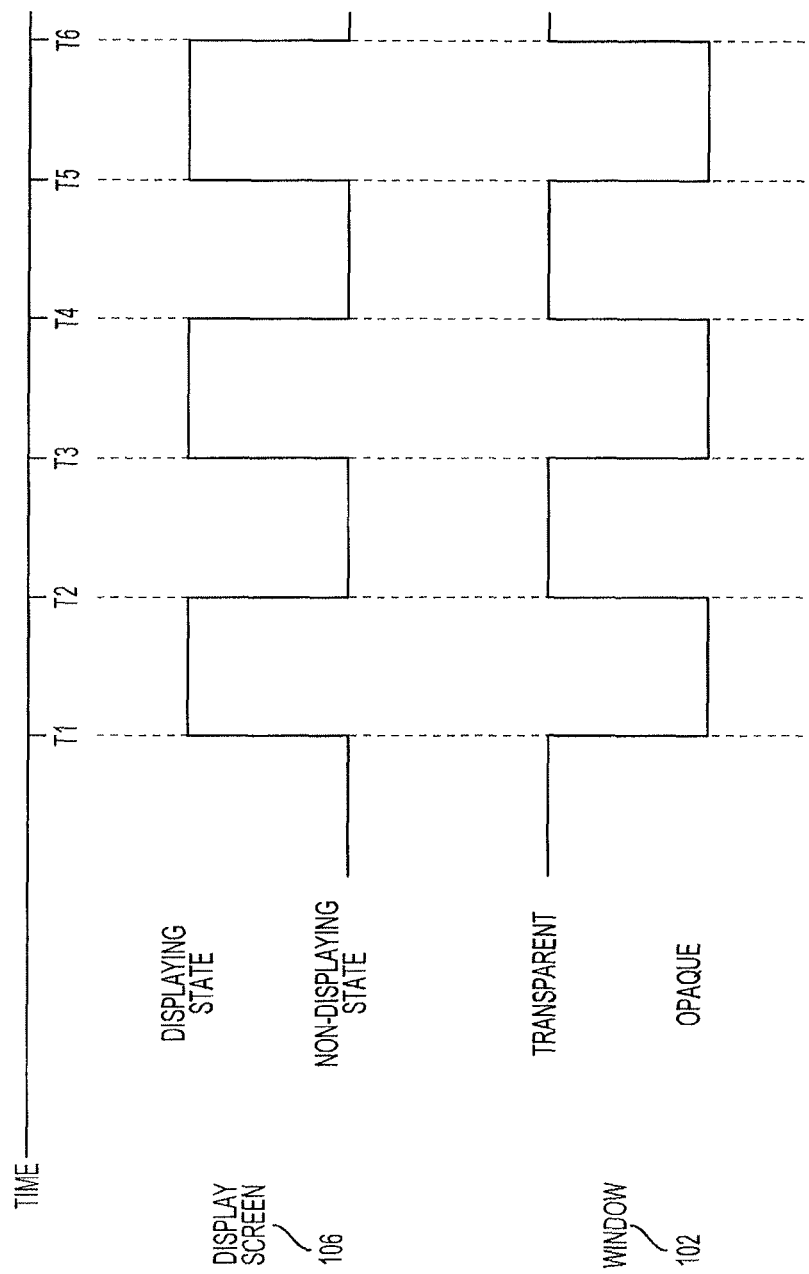
FIG. 4 is a graph of elements of the vehicle display screen safety and privacy system, according to an embodiment of the invention.

FIG. 4 is a graph of respective states of the window 102 and the display screen 106 inside the vehicle 100. As described herein, the display screen 106 and the window 102 rapidly alternate between states at a common or the same predetermined frequency. When the window 102 is viewed individually while the window 102 rapidly alternates between opaque and transparent states, the predetermined frequency is such that the alternating is unable to be detected by human vision. In some embodiments, the predetermined frequency of alternating states is at least 30 Hz. In some embodiments, while the window 102 rapidly alternates between opaque and transparent states, the window 102 is capable of being seen through.

Likewise, when the display screen 106 is viewed individually while the display screen 106 rapidly alternates between the displaying and non-displaying states, the predetermined frequency is such that the alternating of states is unable to be detected by human vision. In some embodiments, when viewing the display screen 106 individually while the display screen 106 alternates between the displaying and non-displaying states, what is displayed on the display screen 106, such as a scene from a movie or a map with navigation instructions, is able to be seen.

As shown in FIG. 4, before time t1, the display screen 106 is in a non-displaying state and the window 102 is in a transparent state. An outside viewer is able to see through the window 102, but sees nothing on the display screen 106, as it is in the non-displaying state.

At time t1, the display screen 106 transitions from the non-displaying state to the displaying state and the window 102 transitions from the transparent state to the opaque state. Accordingly, the outside viewer is unable to see through the window 102, and is unable to see the display screen 106 in the display state.

At time t2, the display screen 106 transitions from the displaying state to the non-displaying state and the window 102 transitions from the opaque state to the transparent state. As was the case before time t1, the outside viewer is able to see through the window 102, but sees nothing on the display screen 106, as it is in the non-displaying state.

The window 102 and the display screen 106 continue synchronized alternating between the respective states through time t3, t4, t5, t6, etc., as long as the device 206 which includes display screen 106 is powered on. When the device 206 is powered off, the display screen is in a continuous non-displaying state and the window 102 may be in a continuous transparent state.

In some embodiments, the ECU 202 instructs each of the window 102 and the display screen 106 to transition at the same time. For example, at time t1, the ECU 202 communicates an indication to the window 102 to transition from the transparent state to the opaque state. In some embodiments, the indication is a change of a voltage applied to the window 102. In the same example, at time t1, the ECU 202 communicates an indication to the display screen 106 to transition from the non-displaying state to the displaying state. In some embodiments, the indication is communicated to the device 206, which controls the display screen 106. In some embodiments, when the display screen 106 and the ECU 202 are connected wirelessly, the indications are communicated via respective transceivers (e.g., the device transceiver 264 and the vehicle transceiver 258 of FIG. 2B).

In some embodiments, the device 206 communicates an indication to the window 102 to transition states. In some such embodiments, the device 206 may communicate with the window 102 via the ECU 202. For example, at time t1, the display screen 106 transitions from the non-displaying state to the displaying state. Accordingly, the device 206 communicates an indication to the ECU 202 to instruct the window 102 to transition from the transparent state to the opaque state. The ECU 202 communicates the indication to the window 102 to transition from the transparent state to the opaque state. In some embodiments, the transmission of instructions is sufficiently fast that a lag is not detectable by human vision. In some embodiments, a lag time is accounted for, such that the respective transitions of state of the display screen 106 and the window 102 occur at the same time (e.g., at time t1, t2, t3, etc.).

In some embodiments, the ECU 202 communicates to both the display screen 106 and the window 102, a predetermined frequency at which to alternate states and a start signal to begin the alternating of states. In some embodiments, the ECU 202 periodically calibrates the display screen 106 and the window 102, to ensure the transitioning of states remains synchronized.

Figure 5:
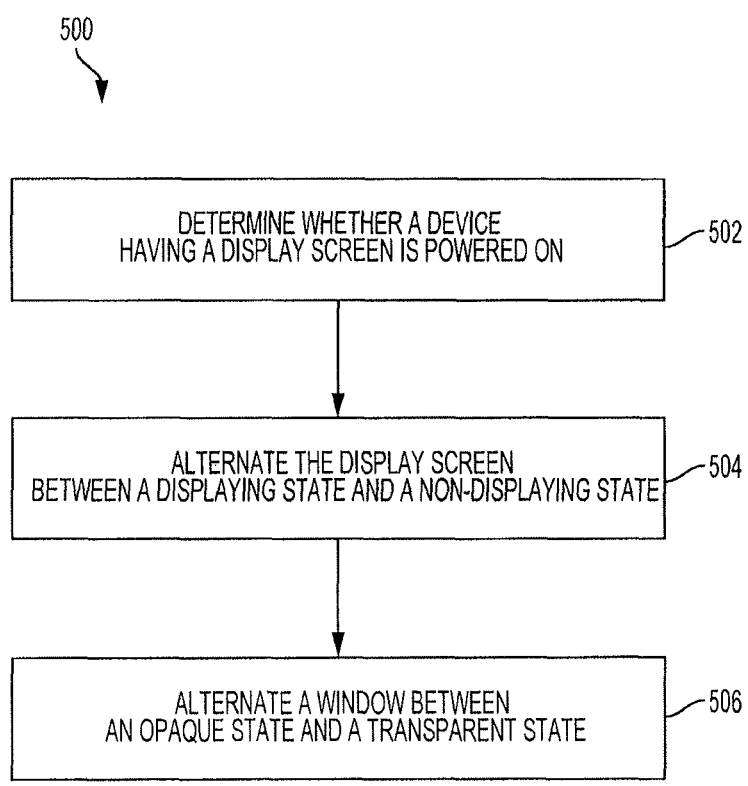
FIG. 5 illustrates an example of a flowchart describing an operation of the vehicle display screen safety and privacy system, according to an embodiment of the invention.

FIG. 5 illustrates an example of a flowchart describing an operation of the vehicle display screen safety and privacy system, according to an embodiment of the invention. Initially, it is determined whether a display screen 106 located in the vehicle 100 is powered on (step 502). In some embodiments, when the device 206 is powered on, the display screen 106 is also powered on and in a displaying state. The device 206 may communicate, to the ECU 202, an indication that the device 206 and/or the display screen 106 are powered on. In some embodiments, the display screen 106 enters a non-displaying state after a predetermined amount of time passes and the device 206 is not interacted with. For example, when the device 206 is a video game system, if it does not receive any input from a video game controller, the display screen associated with the video game system may turn off, in order to conserve energy.

When the display screen 106 is powered on, the display screen 106 alternates between a displaying state and a non-displaying state, as described herein (step 504). In some embodiments, the display screen 106 alternates at a predetermined frequency that is sufficiently high such that the alternating is not detectable by human vision.

A window 102 of the vehicle 100 also alternates between an opaque state and a transparent state (step 506). The window 102 alternates at the same frequency as that of the display screen 106, and when the display screen 106 is in the displaying state, the window 102 is in the opaque state, and when the display screen 106 is in the non-displaying state, the window 102 is in the transparent state. In some embodiments, the window 102 is a rear window. In some embodiments, the window 102 is a side window. When the display screen 106 is powered off or turned off, the window 102 is set to a transparent state, as the display screen 106 is in a non-displaying state.

Figure 6:
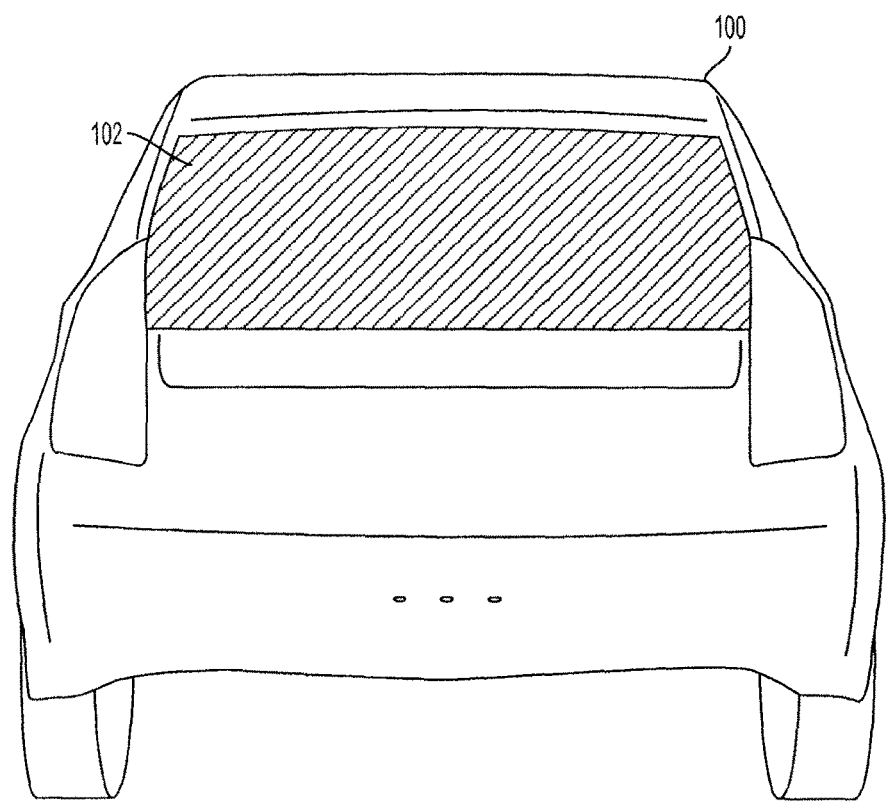
FIG. 6 illustrates an outside viewer point of view in the vehicle display screen safety and privacy system, according to an embodiment of the invention.

In some embodiments of the system, instead of alternating states of the display screen 106 and the window 102, the window 102 is set to an opaque state when the device 206 is powered on and the display screen 106 is also powered on and in a displaying state. FIG. 6 illustrates the vehicle 100 from the point of view of an outside viewer in accordance with these embodiments.

In FIG. 6, the window 102 of the vehicle 100 is entirely opaque, as the display screen 106 inside the vehicle 100 is in a displaying state. In an example embodiment, when the device 206 is an integrated entertainment unit having a display screen 106, and an occupant of the vehicle 100 powers the entertainment unit on and begins watching a movie, the window 102 is set to the opaque state. When the occupant either turns off the entertainment unit or the movie is paused and/or the display screen 106 is set to a non-displaying state to conserve energy, the window 102 is set to the transparent state. In some embodiments, the system may be disabled by an occupant or an operator of the vehicle 100 based on user preferences. For example, the occupant or the operator of the vehicle 100 may prefer to disable the display screen safety and privacy system based on the time of day, the speed of the vehicle 100, the number of passengers in the vehicle 100, or the number of other detected vehicles in the vicinity of the vehicle 100.

Figure 7:
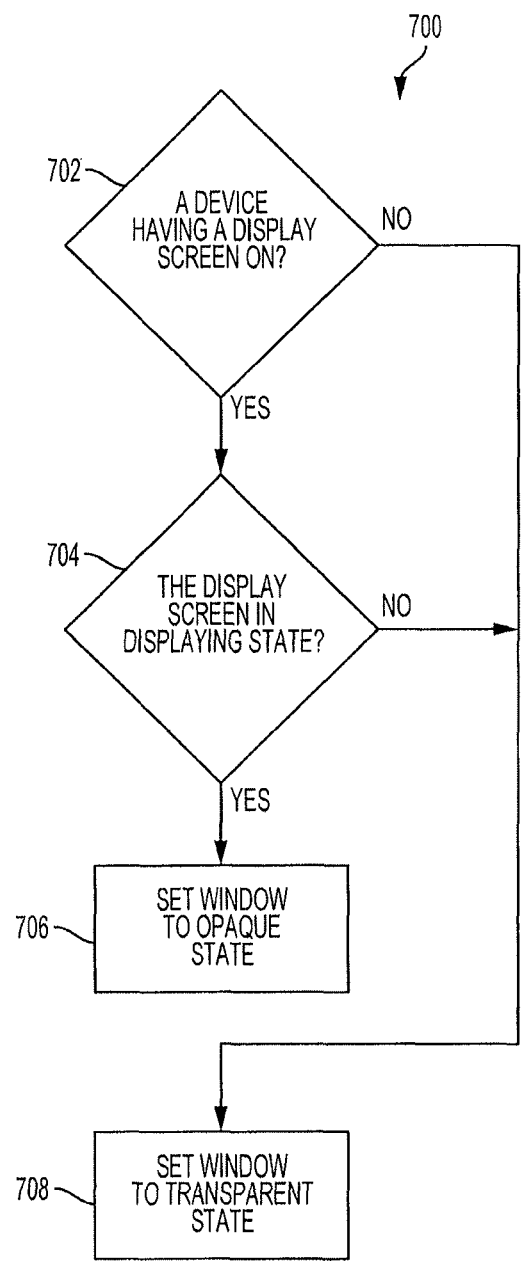
FIG. 7 illustrates an example of a flowchart describing an operation of the vehicle display screen safety and privacy system, according to an embodiment of the invention.

FIG. 7 illustrates an example of a flowchart describing an operation of the vehicle display screen safety and privacy system, according to an embodiment of the invention. Initially, it is determined whether a display screen 106 of a device 206 located in a vehicle 100 is powered on (step 702). In some embodiments, the device 206 communicates an indication to the ECU 202 that the device 206 and the display screen 106 are powered on.

When the device 206 and the display screen 106 are powered on, whether the display screen 106 of the device 206 is in a displaying state is determined (step 704). As described herein, the display screen 106 of the device 206 may generally be in a displaying state when the device 206 and the display screen 106 are powered on, but the display screen 106 may be in a non-displaying state when the device 206 is in an energy conserving inactive mode.

When the display screen 106 is in a displaying state, the window 102 of the vehicle 100 is set to an opaque state (step 706). In some embodiments, the entire window 102 of the vehicle 100 may be set to the opaque state to ensure that privacy of the display screens 106 inside the vehicle 100 is established, as shown in FIG. 6.

In some embodiments, the device 206, when setting the display screen 106 to the displaying state, communicates an indication to the window 102 via the ECU 202 of the vehicle 100, to set the window 102 to the opaque state. In some embodiments, only a rear window is set to the opaque state. In some embodiments, all the windows are set to the opaque state. In some embodiments, all the windows are set to the most opaque state as allowable by the jurisdiction in which the vehicle is located. For example, the laws of the jurisdiction where the vehicle is located may establish that the rear window may be completely opaque, the rear side windows may be up to 90% opaque, the front side windows may be up to 30% opaque, and the front windshield may not be opaque at all. In this situation, when the display screen 106 within the vehicle 100 is in the displaying state, the rear window is set to be completely opaque, the rear side windows are set to be 90% opaque, the front side windows are set to be 30% opaque, and the front windshield is set to be 0% opaque.

When the device 206 is not powered on or when the display screen 106 is not in a displaying state (e.g., a non-displaying state, as described herein), the window 102 is set to the transparent state (step 708). In some embodiments, the device 206 periodically communicates an indication to the ECU 202 that the display screen 106 is in a displaying state, to keep the window 102 opaque. When the ECU 202 does not receive the periodic indication, the ECU 202 may communicate an instruction to the window 102 to set the window 102 to the transparent state.

Figure 8A:
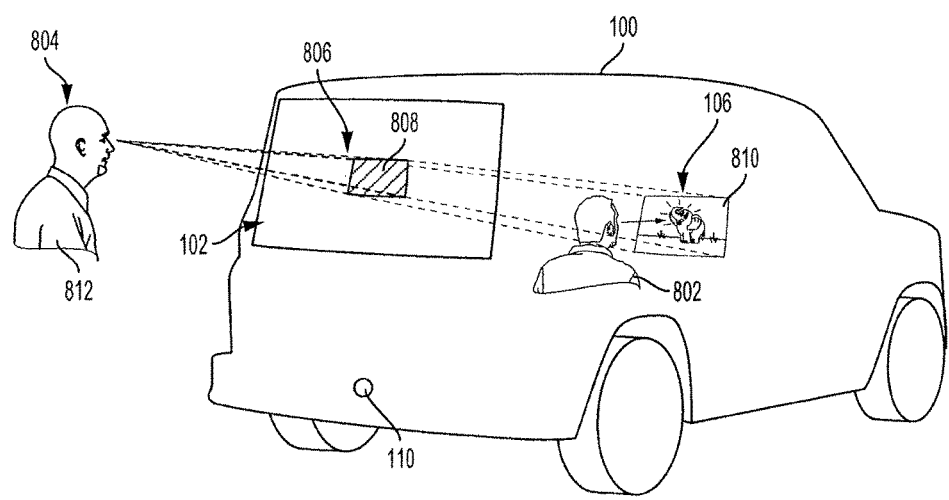
FIGS. 8A and 8B illustrate perspective views of the vehicle display screen safety and privacy system, according to embodiments of the invention.

In some embodiments of the system, instead of setting the entire window 102 to an opaque state, only portions of the window 102 are set to the opaque state to cover or obscure the display screen 106, from the point of view of an outside viewer. FIG. 8A illustrates a vehicle 100 with the window 102 and the display screen 106 and an outside viewer 804 in some such embodiments.

The system detects an outside viewer 804 using a sensor 110 (and associated detection and/or processing devices) of the vehicle 100, as described herein. In some embodiments, the outside viewer 804 is in a secondary vehicle (as shown in FIG. 1A). In some embodiments, the outside viewer 804 is an individual pedestrian on foot.

The system also detects an outside viewer location 812 using the outside viewer sensor 110 (and associated detection and/or processing devices). In some embodiments, the outside viewer location 812 is an eye location or an eye level of the outside viewer 804. In some embodiments, ECU 202 of the vehicle determines location coordinates of the outside viewer location 812.

The display screen 106 is located within the vehicle 100 at the display screen location 810. In some embodiments, the display screen location 810 is stored in the memory 208 of the vehicle 100 as location coordinates within the vehicle 100.

Based on the display screen, location 810 and the outside viewer location 812, a viewing region 806 located at viewing region location 808 is determined. The viewing region 806 corresponds to the area of the window 102 that the outside viewer 804 views the display screen 106 through.

Once the viewing region 806 is determined, the viewing region 806 is set to an opaque state, so that the display screen 106 is obscured to the outside viewer 804. In many embodiments, the system updates the outside viewer location 812 periodically or continuously and updates the viewing region location 808 so that the outside viewer 804 is unable to maneuver around the viewing region 806 to view the display screen 106. An occupant 802 of the vehicle 100 viewing the display screen 106 is unaffected, as the window 102 having the viewing region 806 is not between the occupant 802 and the display screen 106.

Figure 8B:
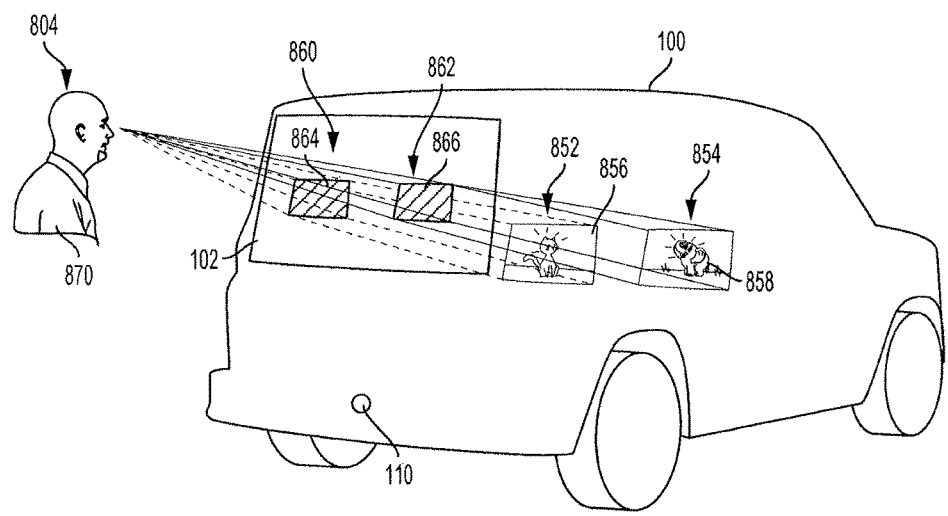

Turning to FIG. 8B, an illustration of more than one display screen within the vehicle 100 is shown. The vehicle 100 contains a first display screen 852 at a first display screen location 856 and a second display screen 854 at a second display screen location 858.

As described herein, the sensor 110 detects image data or spatial data associated with the outside viewer 804 who may be in a secondary vehicle (as shown in FIG. 1A), or who may be on foot. The ECU 202 determines an outside viewer location 870 based on the detected image data or spatial data.

The ECU 202 determines a first viewing region 860 corresponding to the first display screen 852. As described herein, the ECU 202 determines the first viewing region 860 based on the outside viewer location 870 and the first display screen location 856. The ECU 202 also determines a second viewing region 862 corresponding to the second display screen 854 based on the outside viewer location 870 and the second display screen location 858.

Once the first viewing region 860 located at a first viewing region location 864 and the second viewing region 862 located at a second viewing region location 866 are determined, the first viewing region 860 and the second viewing region 862 are set to an opaque state. The remaining portion of the window 102 is set to a transparent state. Any number of detected outside viewers and display screens within the vehicle may be accounted for by the system, resulting in any portion of the window 102 being set to the opaque state.

Figure 9:
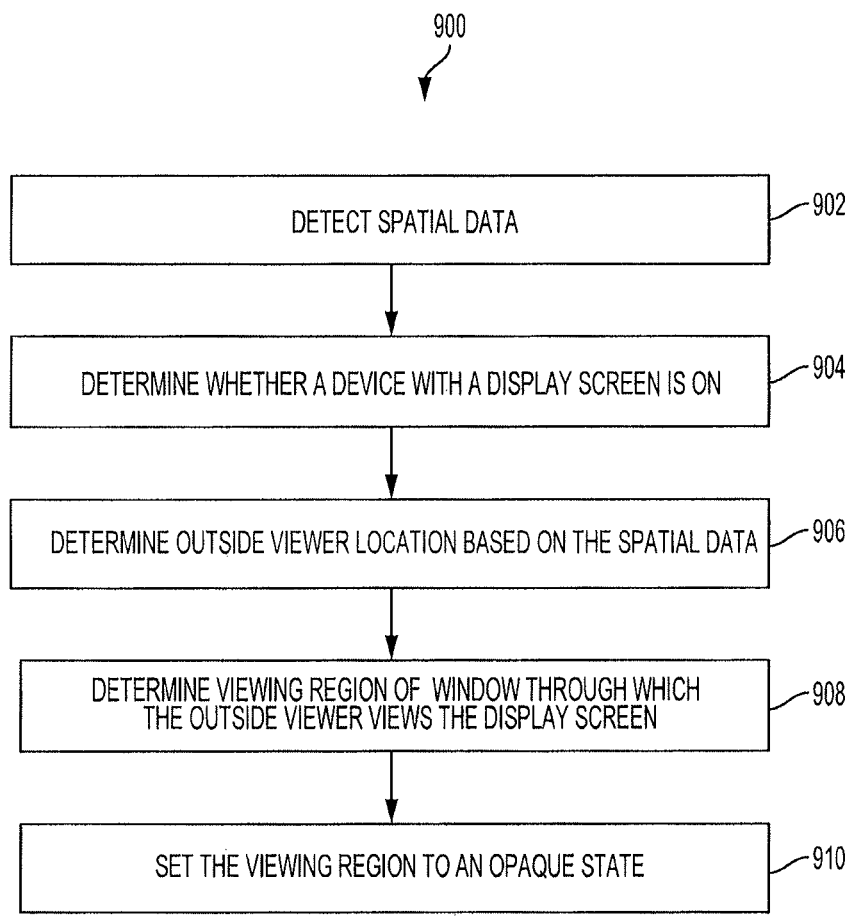
FIG. 9 illustrates an example of a flowchart describing an operation of the vehicle display screen safety and privacy system, according to an embodiment of the invention.

FIG. 9 illustrates an example of a flowchart describing an operation of the vehicle display screen safety and privacy system, according to an embodiment of the invention. While the process 900 is discussed with respect to components shown in FIG. 2A in a situation shown in FIG. 8A, the steps of the process 900 may be performed using any combination of the components in FIGS. 2A or 2B and situations shown in FIGS. 8A or 8B.

Initially, spatial data is detected by an outside viewer sensor 110 (step 902). In some embodiments, the spatial data indicates a relative location of a secondary vehicle (as shown in FIG. 1A) to a reference point of the vehicle 100. In some embodiments, the spatial data indicates a relative location of an outside viewer 804 within the secondary vehicle to the reference point of vehicle 100. It is also determined whether the display screen 106 of the device 206 is powered on, as described herein (step 904).

An outside viewer location 812 is determined based on the detected spatial data (step 906). In some embodiments, when the spatial data shows a vehicle, but not an outside viewer, the location of the outside viewer may be inferred. In some embodiments, in order to determine the outside viewer location 812, a type of vehicle associated with the secondary vehicle may be determined. The spatial data may be compared against vehicle recognition data stored in the memory 208 to determine a type of vehicle associated with the secondary vehicle. The spatial data may include data points associated with the secondary vehicle bumper location, grill features, headlight features, and manufacturer emblem shape. The spatial data may be compared by the ECU 202 against the vehicle recognition data to determine that the secondary vehicle is a vehicle of a particular make and model. Based on the make and model of the vehicle, an approximate outside viewer location 812 may be determined, assuming driver and passenger positions within a given vehicle remain relatively constant from person to person. For example, a driver in a low sports car is likely to sit lower than a driver of a tall truck. Accordingly, the driver of the low sports car is likely to have a lower viewing angle of the interior display screen of the vehicle in front of it than the driver of the tall truck. In some embodiments, the outside viewer location 812 is a set of location coordinates relative to a fixed reference point of the vehicle 100. Furthermore, the area of the window that is transitioned may include a safety margin (or pad) around the expected view of the driver behind the vehicle using the display screen safety and privacy system.

In some embodiments, when the spatial data is sufficiently precise for the ECU 202 to detect an outside viewer 804 within the secondary vehicle, an outside viewer location 812 may be determined directly from the spatial data. A viewing region 806 of the window 102 through which the outside viewer 804 views the display screen 106 is determined (step 908). The ECU 202 determines the viewing region 806 based on the outside viewer location 812 and a display screen location 810.

The display screen location 810 may be determined by a set of location coordinates within the vehicle 100 associated with the display screen 106, when the display screen 106 is at a fixed location. When the display screen 106 is part of a separate device (as shown in FIG. 2B), the device of the display screen 106 may identify the display screen location 810 to the ECU 202 relative to a fixed reference point of the vehicle 100. In some embodiments, when the display screen is part of a separate device, the display screen location 810 is determined by the ECU 202 using sensors within the passenger cabin or compartment of the vehicle 100. For example, the display screen 106 may be located using a system of RFID tags and sensors to approximate the location of the display screen 106 within the vehicle 100.

In some embodiments, the ECU 202 determines the viewing region location 808 of the viewing region 806 by modeling the outside viewer 804 relative to the window 102 and the display screen 106. In some embodiments, the ECU 202 determines a field of view from the outside viewer location 812, and determines a displaying field of the display screen 106. Where the field of view and the displaying field intersect on the window 102 may be determined to be the viewing region 806. While the figures illustrate the viewing region as a rectangle, the viewing region may be any shape, as determined by the ECU 202 of the vehicle 100.

The viewing region 806 is set to an opaque state (step 910). In some embodiments, the remaining portion of the window 102 is set to a transparent state. Thus, an occupant 802 of the vehicle 100 is able to view the display screen 106 but the outside viewer 804 is unable to view the display screen 106, as the viewing region 806 of the window 102 is in the opaque state.

The viewing region may be constantly or periodically updated by repeating the steps of the process 900 in order to prevent the outside viewer from being able to maneuver in a manner to view the display screen 106. In an example embodiment, the outside viewer sensor 110 may detect updated spatial data, and the ECU 202 may determine an updated outside viewer location based on the updated image or spatial data. The ECU 202 may also determine an updated viewing region based on the updated outside viewer location. Accordingly, the updated viewing region of the window 102 is set to the opaque state and a remainder of the window 102 is set to a transparent state. In some embodiments, the updated viewing region is determined and the updated viewing region is set to the opaque state with a response time such that the outside viewer 804 is unable to maneuver around the viewing region 806 to view the display screen 106. In some embodiments, the window 102 is configured to be able to transition between an opaque state and a transparent state quickly enough to provide updated viewing region adjustments.

Figure 10A:
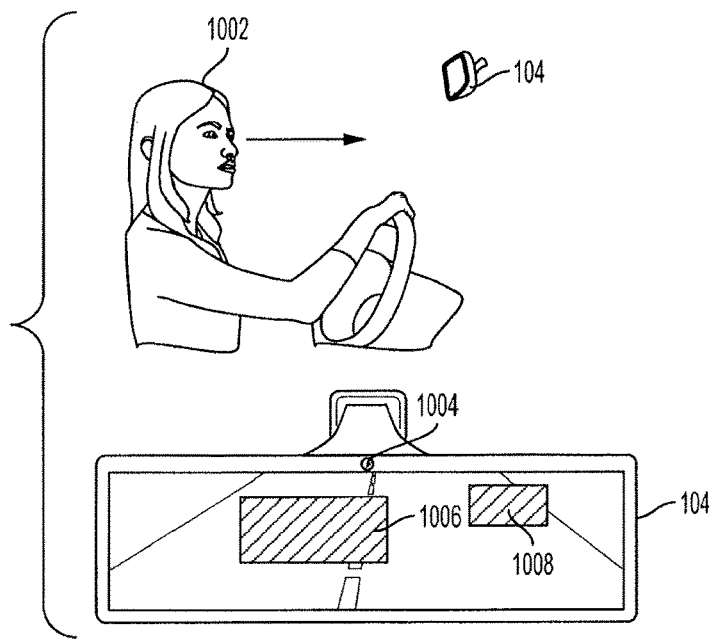
FIGS. 10A-10C illustrate a driver point of view in the vehicle display screen safety and privacy system, according to an embodiment of the invention.
Figure 10B:
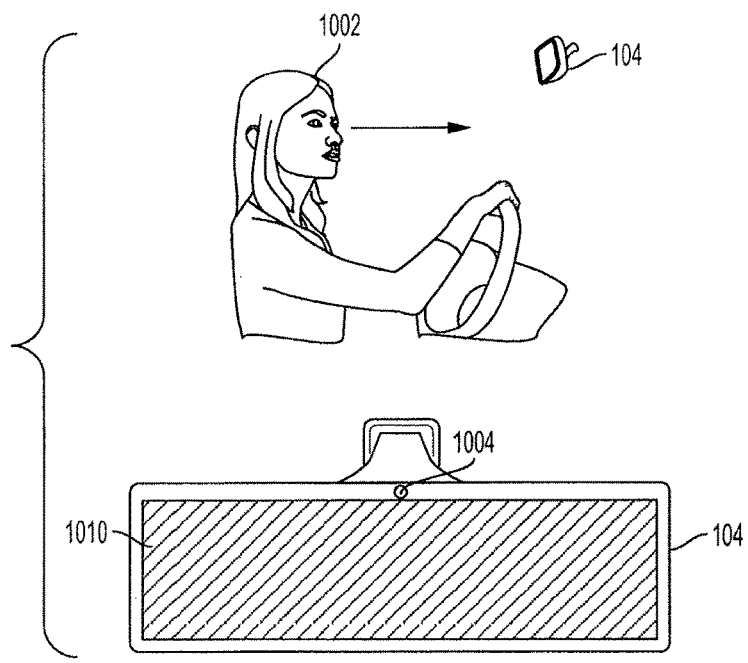
Figure 10C:
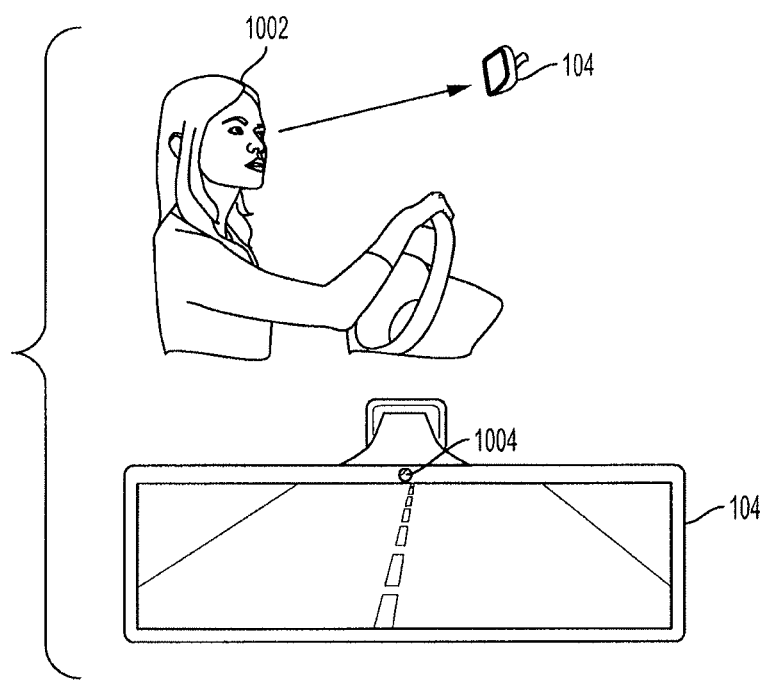

FIGS. 10A-10C illustrate a scenario where the window 102 is dynamically set to a transparent state based on whether the driver 1002 is looking through the window 102. In some situations, when the window 102 is set to an opaque state, a driver's rearward view may be obstructed by the window 102 (or regions thereof) being made opaque. In response, the system may adjust when the window 102 is set to the opaque state based on a determination of whether the driver is looking through the window 102.

In FIG. 10A, the driver 1002 of the vehicle 100 is looking forward at the road ahead of the driver 1002. At the same time, the window 102 has two viewing regions 1006 and 1008 that are opaque in order to obscure the view of one or more display screens 106 within the vehicle 100. The vehicle 100 includes a rear view mirror 104 with a driver eye sensor 1004. The driver eye sensor 1004 is configured to detect when the driver 1002 is looking into the rear view mirror 104 and through the window 102. The two viewing regions 1006 and 1008 are viewable in the rear view mirror 104. In FIG. 10A, as the driver 1002 is not looking into the rear view mirror 104, the two viewing regions 1006 and 1008 remain opaque.

In an alternate embodiment, as shown in FIG. 10B, the entire window 102 may be opaque, resulting in a viewing region 1010 that occupies the entire window 102 and is viewable from the rear view mirror 104.

In FIG. 10C, the driver 1002 of the vehicle 100 is looking into the rear view mirror 104. The driver eye sensor 1004 of the rear view mirror 104 detects that the driver is looking into the rear view mirror 104 and accordingly the window 102 is set to the transparent state. In some embodiments, the driver eye sensor 1004 detects the eyes of the driver and detects gaze data indicating where the eyes are looking. The driver eye sensor 1004 may provide the gaze data to the ECU 202, which determines whether the driver 1002 is looking into the rear view mirror 104, and consequently, whether to set the window 102 to the transparent state.

While FIGS. 10A-10C illustrate the driver viewing a rear window 102, if a side window is set to an opaque state, the system may set the side window to a transparent state when the system determines the driver is looking through the side window, using the driver eye sensor 1004. In some embodiments, the driver eye sensor 1004 is not a part of the rear view mirror and may be located anywhere within the passenger cabin proximate to the driver in order to detect gaze data of the driver's eyes.

Figure 11:
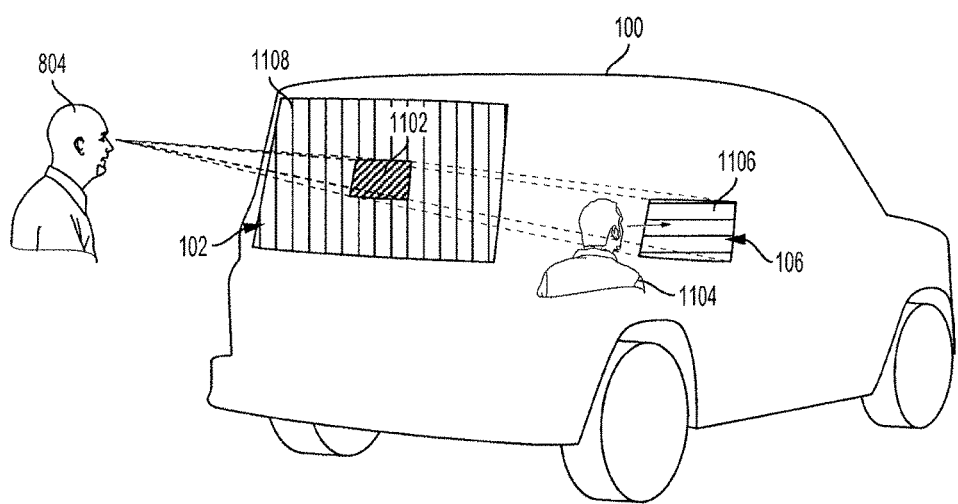
FIG. 11 illustrates a perspective view of the vehicle display screen safety and privacy system, according to an embodiment of the invention.

In some embodiments of the vehicle display screen safety and privacy system, the display screen 106 is obscured by use of two polarized light filters applied to the window 102 and the display screen 106. FIG. 11 illustrates a vehicle 100 having a display screen 106 and a window 102. The display screen 106 has a polarized light filter 1106 oriented in a first direction. In this example embodiment, the display screen 106 has a polarized light filter 1106 oriented 90 degrees from vertical. Additionally, the window 102 has a polarized light filter 1108 oriented in a second direction perpendicular to the first direction. In this example embodiment, the window 102 has a polarized light filter 1108 oriented 0 degrees from vertical.

As the window 102 has a polarized light filter 1108 oriented in a direction perpendicular to the polarized light filter 1106 of the display screen 106, the light emitted from the display screen 106 is blocked from the view of an outside viewer 804. The obscured region 1102 is created by the two filters filtering out all of the light from the display screen 106.

An occupant 1104 inside the vehicle 100 is able to view the display screen 106, but the outside viewer 804 is unable to see the display screen 106 as the light is blocked, creating the obscured region 1102 no matter where the outside viewer 804 is located.

In some embodiments, the polarized light filters 1106 and 1108 are movable and may be configured to be applied or retracted from covering the display screen 106 and the window 102, respectively. In some embodiments, the polarized light filter 1108 of the window 102 is applied when the display screen 106 is in a displaying state. In some such embodiments, the ECU 202 communicates an indication to the polarized light filter 1108 of the window 102 to be applied to the window, in response to a detection of the display screen 106 being in a displaying state.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for improving safety while providing privacy for occupants of a vehicle, the system comprising:
   a display screen located at a display screen location within the vehicle;
   a window having one or more regions each configured to transition between an opaque state and a transparent state;
   an outside sensor configured to detect an outside viewer located outside of the vehicle; and
   an electronic control unit (ECU) configured to:
   determine whether the display screen is powered on,
   determine an outside viewer location when the display screen is powered on,
   determine a viewing region of the window through which the outside viewer views the display screen based on the display screen location and the outside viewer location, and
   set the viewing region of the window to the opaque state.

2. The system of claim 1, wherein the vehicle further comprises a driver eye sensor configured to determine whether a driver of the vehicle is looking at a rear view mirror of the vehicle, and wherein the ECU is further configured to transition the viewing region of the window from the opaque state to the transparent state when the driver of the vehicle is looking at the rear view mirror.

3. The system of claim 1, wherein the outside sensor is further configured to detect spatial data associated with the outside viewer, and wherein the ECU is configured to determine the outside viewer location based on the spatial data associated with the outside viewer.

4. The system of claim 3, wherein the outside sensor is further configured to detect updated spatial data associated with the outside viewer, and wherein the ECU is further configured to:
   determine an updated outside viewer location based on the updated spatial data,
   determine an updated viewing region of the window through which the outside viewer views the display screen based on the display screen location and the updated outside viewer location, and
   set the updated viewing region of the window to the opaque state.

5. The system of claim 3, wherein the ECU is further configured to:
   detect vehicle recognition data of a secondary vehicle located behind the vehicle based on the spatial data; and
   determine the outside viewer location based on the vehicle recognition data.

6. The system of claim 1, wherein the vehicle further comprises a second display screen located at a second display screen location within the vehicle, and wherein the ECU is further configured to:
   determine a second viewing region of the window through which the outside viewer views the second display screen based on the second display screen location and the outside viewer location, and
   set the second viewing region of the window to the opaque state.

7. The system of claim 1, wherein the window is made of LCD glass configured to independently transition each of the one or more regions of the window between the transparent state and the opaque state based on a voltage applied to the window.

8. A vehicle comprising:
   a display screen located at a display screen location within the vehicle;
   a window having one or more regions each configured to transition between an opaque state and a transparent state;
   an outside sensor configured to detect spatial data associated with an outside viewer located outside of the vehicle; and
   an electronic control unit (ECU) configured to:
   determine whether the display screen is powered on,
   determine an outside viewer location based on the spatial data when the display screen is powered on,
   determine a viewing region of the window through which the outside viewer views the display screen based on the display screen location and the outside viewer location, and
   set the viewing region of the window to the opaque state.

9. The vehicle of claim 8, wherein the vehicle further comprises a driver eye sensor configured to determine whether a driver of the vehicle is looking at a rear view mirror of the vehicle, and wherein the ECU is further configured to transition the viewing region of the window from the opaque state to the transparent state when the driver of the vehicle is looking at the rear view mirror.

10. The vehicle of claim 8, wherein the outside sensor is further configured to detect updated spatial data associated with the outside viewer, and wherein the ECU is further configured to:
determine an updated outside viewer location based on the updated spatial data,
determine an updated viewing region of the window through which the outside viewer views the display screen based on the display screen location and the updated outside viewer location, and
set the updated viewing region of the window to the opaque state.

11. The vehicle of claim 8, wherein the vehicle further comprises a second display screen located at a second display screen location within the vehicle, and wherein the ECU is further configured to:
determine a second viewing region of the window through which the outside viewer views the second display screen based on the second display screen location and the outside viewer location, and
set the second viewing region of the window to the opaque state.

12. The vehicle of claim 8, wherein the ECU is further configured to:
detect vehicle recognition data of a secondary vehicle located behind the vehicle based on the spatial data; and
determine the outside viewer location based on the vehicle recognition data.

13. The vehicle of claim 8, wherein the window is made of LCD glass configured to independently transition each of the plurality of regions between the transparent state and the opaque state based on a voltage applied to the window.

14. The vehicle of claim 8, wherein the window is a rear window of the vehicle, such that view of the display screen is obscured to an outside viewer located behind the vehicle.

15. A method for improving safety while providing privacy for a vehicle having a rear window and a display screen located at a display screen location, the method comprising:
detecting, by an outside sensor, spatial data associated with an outside viewer located outside of the vehicle;
determining, by an electronic control unit (ECU), whether the display screen is powered on;
determining an outside viewer location based on the spatial data when the display screen is powered on;
determining, by the ECU, a viewing region of the window through which the outside viewer views the display screen based on the display screen location and the outside viewer location; and
setting, by the ECU, the viewing region of the window to the opaque state.

16. The method of claim 15, further comprising:
determining, by a driver eye sensor, whether a driver of the vehicle is looking at a rear view mirror of the vehicle; and
setting, by the ECU, the viewing region of the window to the transparent state when the driver of the vehicle is looking at the rear view mirror.

17. The method of claim 15, further comprising:
detecting, by the outside sensor, updated spatial data associated with the outside viewer;
determining, by the ECU, an updated outside viewer location based on the updated spatial data;
determining, by the ECU, an updated viewing region of the window through which the outside viewer views the display screen based on the display screen location and the updated outside viewer location; and
setting, by the ECU, the updated viewing region of the window to the opaque state.

18. The method of claim 15, further comprising:
determining, by the ECU, a second viewing region of the window through which the outside viewer views a second display screen located at a second display screen location based on the second display screen location and the outside viewer location; and
setting, by the ECU, the second viewing region of the window to the opaque state.

19. The method of claim 15, further comprising:
detecting, by the ECU, vehicle recognition data of a secondary vehicle located behind the vehicle based on the spatial data; and
determining, by the ECU, the outside viewer location based on the vehicle recognition data.

20. The method of claim 15, wherein the window is made of LCD glass configured to independently transition each of the plurality of regions between the transparent state and the opaque state based on a voltage applied to the window.

* * * * *